(12) United States Patent
Jackiw et al.

(10) Patent No.: US 7,097,765 B1
(45) Date of Patent: Aug. 29, 2006

(54) WATER HEATER FILTER

(76) Inventors: Walter John Jackiw, 18450 Candlewood Ave., Rialto, CA (US) 92377; Aaron Dean Bolin, 20331 Bluffside Cir. #413, Huntington Beach, CA (US) 92646

( * ) Notice: Subject to any disclaimer, the term of this patent is extended or adjusted under 35 U.S.C. 154(b) by 0 days.

(21) Appl. No.: 10/445,451

(22) Filed: May 28, 2003

(51) Int. Cl.
*B01D 27/14* (2006.01)

(52) U.S. Cl. .................. 210/266; 210/282; 210/287

(58) Field of Classification Search ............... 210/259, 210/266, 282, 287, 317, 335
See application file for complete search history.

(56) References Cited

U.S. PATENT DOCUMENTS

| 3,561,602 A | * | 2/1971 | Molitor | ............... 210/266 |
| 4,693,814 A | * | 9/1987 | Brown | ............... 210/88 |
| 5,906,109 A | * | 5/1999 | Dieckmann et al. | ....... 62/238.6 |

* cited by examiner

*Primary Examiner*—Ivars C. Cintins

(57) ABSTRACT

A water heater filter is provided for the removal of minerals and sediments from water, comprising a cylindrical filter housing element comprising an upper chamber and a lower chamber linked by a small diameter section, an inlet fitting, a conical fine mesh stainless steel wire screen positioned within the upper chamber, a first cotton filter positioned within the lower chamber, a second carbon filter comprising activated carbon enclosed in a porous element positioned within the lower chamber, and an outlet fitting. The water heater filter has particular utility in connection with a household water heater.

16 Claims, 2 Drawing Sheets

WATER HEATER FILTER

BACKGROUND OF THE INVENTION

1. Field of the Invention

The present invention relates to a water heater filter for use in connection with removal of minerals and sediments. The water heater filter has particular utility in connection with water filtration for a household water heater.

2. Description of the Prior Art

Water heater filters are desirable for removal of minerals and sediments in order to increase the service life of a water heater.

The use of filters is known in the prior art. For example, U.S. Pat. No. 5,411,661 to Heiligman discloses a water filter module for a drip coffee brewer. However, the Heiligman '661 patent does not provide a water filter for use with a household water heater.

U.S. Pat. No. 6,096,197 to Hughes discloses a shower filter for chlorine removal and scale deposit prevention. However, the Hughes '197 patent does not provide a water filter for use with a household water heater.

U.S. Pat. No. Des. 323,873 to Yanou et al. discloses a micro filter for water or gas. However, the Yanou '873 patent does not provide a water filter for use with a household water heater.

U.S. Pat. No. 261,613 to Jones discloses a feed water heater and filter. However, the Jones '613 patent does not provide a water filter for use with a household water heater.

U.S. Pat. No. 6,080,313 to Kelada discloses a point-of-use water purification system with a cascade ion exchange option. However, the Kelada '313 patent does not provide a compact water filter for use with a household water heater.

Lastly, U.S. Pat. No. 5,800,707 to Mehnert et al. discloses a water filter. However, the Mehnert '707 patent does not provide a water filter for use with a household water heater.

While the above-described devices fulfill their respective, particular objectives and requirements, the aforementioned patents do not describe a water heater filter that allows the removal of minerals and sediments in order to increase the service life of a household water heater. The prior art patents make no provision for water filtration for a household water heater with a compact unit having multiple filters.

Therefore, a need exists for a new and improved water heater filter that can be used for water filtration for a household water heater. In this regard, the present invention substantially fulfills this need. In this respect, the water heater filter according to the present invention substantially departs from the conventional concepts and designs of the prior art, and in doing so provides an apparatus primarily developed for the purpose of water filtration for a household water heater.

SUMMARY OF THE INVENTION

In view of the foregoing disadvantages inherent in the known types of filters now present in the prior art, the present invention provides an improved water heater filter, and overcomes the above-mentioned disadvantages and drawbacks of the prior art. As such, the general purpose of the present invention, which will be described subsequently in greater detail, is to provide a new and improved water heater filter which has all the advantages of the prior art mentioned heretofore and many novel features that result in a water heater filter which is not anticipated, rendered obvious, suggested, or even implied by the prior art, either alone or in any combination thereof.

To attain this, the present invention essentially comprises a water heater filter, comprising a cylindrical filter housing element, an inlet fitting, a fine mesh wire screen, a first cotton filter, a second carbon filter, and an outlet fitting.

In one embodiment, the present invention comprises a water heater filter, comprising a cylindrical filter housing element comprising an upper chamber and a lower chamber linked by a small diameter section, an inlet fitting at the outer end of the upper chamber, a fine mesh stainless steel wire screen positioned within the upper chamber, a first cotton filter positioned within the lower chamber, a second carbon filter positioned within the lower chamber, and an outlet fitting at the outer end of the lower chamber.

In another embodiment, the present invention comprises a water heater filter for the removal of minerals and sediments from water, comprising a cylindrical filter housing element comprising an upper chamber and a lower chamber linked by a small diameter section, an inlet fitting at the outer end of the upper chamber, a conical fine mesh stainless steel wire screen positioned within the upper chamber, a first cotton filter positioned within the lower chamber, a second carbon filter comprising activated carbon enclosed in a porous element positioned within the lower chamber, and an outlet fitting at the outer end of the lower chamber.

There has thus been outlined, rather broadly, the more important features of the invention in order that the detailed description thereof that follows may be better understood and in order that the present contribution to the art may be better appreciated.

The invention may also include a silica gel filter, a third chamber, and reducers and adapters to permit use with pipes of various diameters. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved water heater filter that has all of the advantages of the prior art filters and none of the disadvantages.

It is another object of the present invention to provide a new and improved water heater filter that may be easily and efficiently manufactured and marketed.

An even further object of the present invention is to provide a new and improved water heater filter that has a low cost of manufacture with regard to both materials and labor, and which accordingly is then susceptible of low prices of sale to the consuming public, thereby making such water heater filter economically available to the buying public.

Still another object of the present invention is to provide a new water heater filter that provides in the apparatuses and methods of the prior art some of the advantages thereof, while simultaneously overcoming some of the disadvantages normally associated therewith.

Even still another object of the present invention is to provide a water heater filter for water filtration for a household water heater. This allows the removal of minerals and sediments in order to increase the service life of a water heater.

Still yet another object of the present invention is to provide a compact water heater filter for water filtration for a household water heater. This makes it possible to conveniently prevent sediments from entering a home hot water supply.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
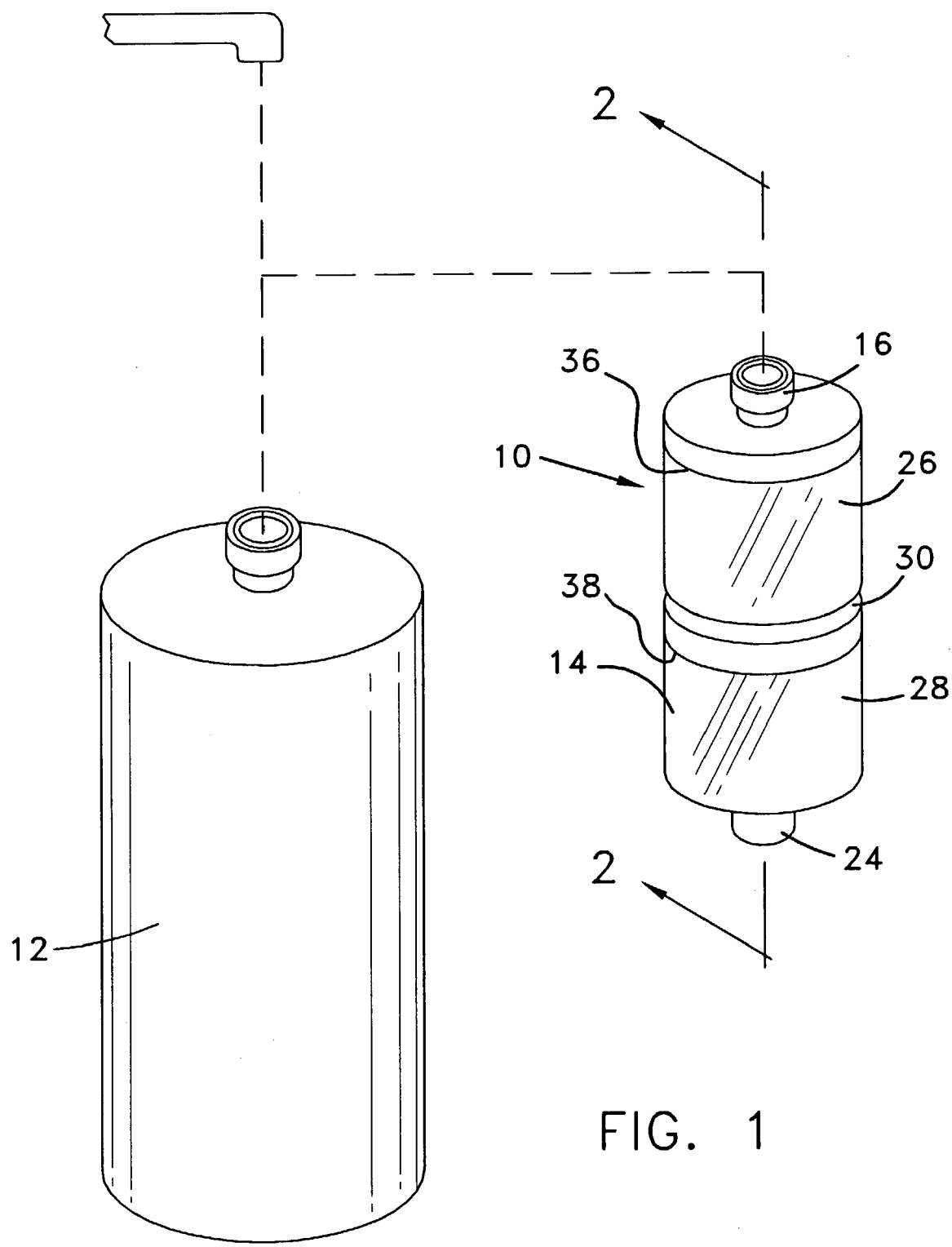
FIG. 1 is a front perspective view of the preferred embodiment of the water heater filter constructed in accordance with the principles of the present invention.
Figure 2:
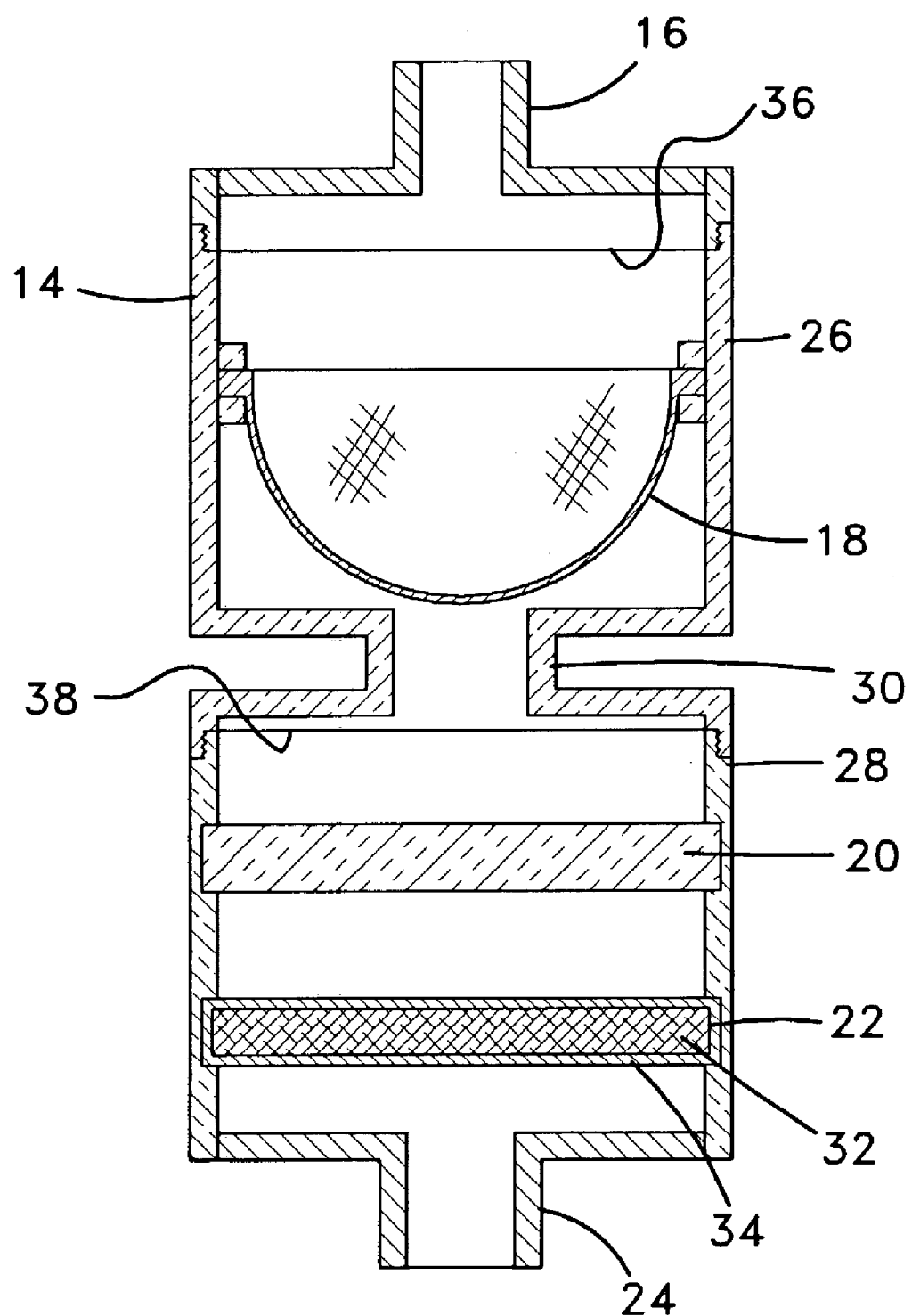
FIG. 2 is a front elevational cross-sectional view of the water heater filter of the present invention shown in FIG. 1, taken along the line 2—2.

Referring now to the drawings, and particularly to FIGS. 1–2, a preferred embodiment of the water heater filter of the present invention is shown and generally designated by the reference numeral 10.

In FIG. 1, a new and improved water heater filter 10 of the present invention for use in connection with removal of minerals and sediments is illustrated and will be described. More particularly, the water heater filter 10 for a water heater 12 comprises a cylindrical filter housing element 14, an inlet fitting 16, and an outlet fitting 24. The cylindrical filter housing element 14 comprises an upper chamber 26 and a lower chamber 28 linked by a small diameter section 30.

FIG. 2 is a front elevational cross-sectional view of the water heater filter of the present invention, and illustrates the filter housing element 14, inlet fitting 16, a fine mesh wire screen 18, a cotton filter 20, a carbon filter 22, and an outlet fitting 24. The fine mesh wire screen 18 is parabolic in cross-section. The cylindrical filter housing element 14 comprises an upper chamber 26 and a lower chamber 28 linked by a small diameter section 30. The carbon filter 22 comprises activated carbon 32 enclosed in a porous element 34. The filter 10 may be disassembled for cleaning and servicing. Namely, the upper portion of the filter 10 screws off 36 to allow the mesh wire screen 18 to be cleaned. The lower portion of the filter 10 also screws off 38 to allow access to the carbon filter 22, allowing said filter 22 to be interchanged and refreshed.

The water heater filter of the present invention is a new type of potable water filter design. Its primary purpose is to remove minerals capable of causing the formation of scale within water heaters, pipes, faucets, etc. In one embodiment, it features a cylindrical design that measures about 6 to 9 inches high by about 3 to 5 inches in diameter. In this embodiment it features upper and lower chambers that are linked via a short narrow section comprising about 1-inch diameter tubing. The outer ends of the water heater filter are equipped with fittings that permit it to interface with ½-inch copper water lines. Necessary reducers and adapters may be employed in order to permit use with pipes of other diameters and construction. The upper chamber contains a fine mesh stainless steel wire screen. The lower chamber contains cotton and activated carbon filter elements. The lower chamber may additionally contain a silica gel filter element. The water heater filter of the present invention fulfills the need for a new type of potable water filter design.

The appealing features of the water heater filter of the present invention include its simplicity, adaptability, and ability to improve water quality and extend the life expectancy of water heaters and other plumbing system components. The water heater filter of the present invention is adapted for use in most residential and light commercial potable water supply systems. In operation, it removes suspended particles and other contaminates, thereby helping prevent them from accumulating in a water heater. It also helps to improve the overall taste and quality of water. The water heater filter of the present invention may be produced easily using conventional and readily available materials and manufacturing processes. No new production technology is required.

In one embodiment, the water heater filter of the present invention is fabricated from sections of rigid plastic. The rigid plastic may comprise injection-molded polyvinylchloride (PVC), high-density polyethylene (HDPE), acrylonitrile-butadiene-styrene (ABS) resin, or another suitable plastic. In another embodiment, the water heater filter comprises transparent plastic such as polystyrene (PS) so a user can see when the filter is dirty and needs to be replaced. Adapter fittings may be any standard fittings comprising copper or plastic material. The particle filter is made of fine mesh screen that may be set in an injection-molded rubber seal. The screen preferably comprises stainless steel.

In one embodiment, the water heater filter of the present invention provides an in-line filter apparatus uniquely designed for use with household water heaters, whereby the filter includes a first chamber including a curvilinear screen element captured therewithin such that the screen element has a varying thickness from minimal thickness at the central portion thereof to maximum thickness at the edges thereof, and the first chamber is operably associated with a secondary chamber featuring a first cotton filter and a second carbon filter.

In use, it can now be understood that the water heater filter according to the present invention provides water filtration for a household water heater. In particular, the water heater filter according to the present invention provides water filtration for a household water heater with a compact unit having multiple filters.

While a preferred embodiment of the water heater filter has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as copper metal or composite material may be used instead of the plastic described. Also, the fittings may be made of heavy-duty plastic, copper, or similar material. And although water filtration for a household water heater has been described, it should be appreciated that the water heater filter herein described is also suitable for filtering water for any use. Furthermore, a wide variety of shapes and sizes may be used instead of those described.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A water heater filter, comprising:
   a cylindrical filter housing element, wherein the cylindrical filter housing element comprises an upper chamber and a lower chamber linked by a small diameter section having a diameter less than that of the upper and lower chambers;
   an inlet fitting;
   a fine mesh wire screen;
   a first filter, wherein said first filter is made of cotton;
   a second filter, wherein said second filter is made of carbon and the fine mesh wire screen is positioned within the upper chamber, the first filter is positioned within the lower chamber, and the second filter is positioned within the lower chamber; and
   an outlet fitting.

2. The water heater filter of claim 1, wherein the fine mesh wire screen is parabolic in cross-section.

3. The water heater filter of claim 1, wherein the fine mesh wire screen comprises stainless steel.

4. The water heater filter of claim 1, wherein the inlet fitting and outlet fitting are each connectable to copper water lines.

5. The water heater filter of claim 1, wherein the second filter comprises activated carbon enclosed in a porous element.

6. The water heater filter of claim 1, comprising a plastic material.

7. A water heater filter, comprising:
   a cylindrical filter housing element comprising an upper chamber and a lower chamber linked by a small diameter section;
   an inlet fitting at the outer end of the upper chamber;
   a fine mesh stainless steel wire screen positioned within the upper chamber;
   a first filter positioned within the lower chamber, wherein said first filter is made of cotton;
   a second filter positioned within the lower chamber, wherein said second filter is made of carbon; and
   an outlet fitting at the outer end of the lower chamber.

8. The water heater filter of claim 7, further comprising a silica gel filter.

9. The water heater filter of claim 7, wherein the inlet fitting and outlet fitting are each connectable to copper water lines.

10. The water heater filter of claim 7, wherein the fine mesh stainless steel wire screen is parabolic in cross-section.

11. The water heater filter of claim 7, wherein the second filter comprises activated carbon enclosed in a porous element.

12. The water heater filter of claim 7, comprising a plastic material.

13. A water heater filter for the removal of minerals and sediments from water, comprising:
    a cylindrical filter housing element comprising an upper chamber and a lower chamber linked by a small diameter section;
    an inlet fitting at the outer end of the upper chamber;
    a fine mesh stainless steel wire screen having a parabolic cross-section positioned within the upper chamber;
    a first filter positioned within the lower chamber, wherein said first filter is made of cotton;
    a second filter, comprising activated carbon enclosed in a porous element positioned within the lower chamber; and
    an outlet fitting at the outer end of the lower chamber.

14. The water heater filter of claim 13, further comprising a silica gel filter.

15. The water heater filter of claim 13, wherein the inlet fitting and outlet fitting are each connectable to copper water lines.

16. The water heater filter of claim 13, comprising a plastic material.

* * * * *